United States Patent [19]

Corsmeier et al.

[11] Patent Number: 5,143,292
[45] Date of Patent: Sep. 1, 1992

[54] COOLED LEAF SEAL

[75] Inventors: Donald M. Corsmeier, Cincinnati, Ohio; Stephen G. Browning, Syracuse, N.Y.

[73] Assignee: General Electric Company, Cincinnati, Ohio

[21] Appl. No.: 697,542

[22] Filed: May 9, 1991

[51] Int. Cl.⁵ ............................................. F02K 1/38
[52] U.S. Cl. ............................. 239/127.3; 239/265.37
[58] Field of Search ............... 239/127.1, 27.3, 265.11, 239/265.17, 265.19, 265.33–265.41

[56] References Cited

U.S. PATENT DOCUMENTS

| | | | |
|---|---|---|---|
| 3,354,649 | 11/1967 | Madden | 60/271 |
| 3,682,269 | 8/1972 | Jumelle | 239/127.3 |
| 3,892,358 | 7/1975 | Gisslen | 239/264.39 |
| 3,954,135 | 5/1976 | Hewlitt | 165/9 |
| 4,022,948 | 5/1977 | Smith et al. | 428/542.8 |
| 4,093,157 | 6/1978 | Cavanagh, Jr. et al. | 239/127.3 |
| 4,110,972 | 9/1978 | Young et al. | 60/230 |
| 4,171,093 | 10/1979 | Honeycutt, Jr. et al. | 239/127.3 |
| 4,308,968 | 1/1982 | Thiltgen et al. | 220/222 |
| 4,575,006 | 3/1986 | Madden | 239/265.37 |
| 4,575,099 | 3/1986 | Nash | 277/12 |
| 4,813,608 | 3/1989 | Holowach et al. | 239/265.37 |

Primary Examiner—Andres Kashnikow
Assistant Examiner—Karen B. Merritt
Attorney, Agent, or Firm—Jerome C. Squillaro; David L. Narciso

[57] ABSTRACT

A seal assembly includes a housing having a plenum, a leaf seal rotatably joined to the housing to define a hinge. The leaf seal includes flow channels which receive a cooling fluid from the plenum for both cooling the leaf seal and preventing leakage of gases through the hinge.

17 Claims, 7 Drawing Sheets

COOLED LEAF SEAL

The Government has rights in this invention in accordance with Contract No. F33657-83C-0281 awarded by the Department of the Air Force.

TECHNICAL FIELD

The present invention relates generally to leaf seals between adjacent relatively moveable members, and, more specifically, to a leaf seal usable in a gas turbine engine exhaust nozzle.

BACKGROUND ART

A gas turbine engine effective for powering an aircraft at supersonic flight typically includes a variable area exhaust nozzle having primary and secondary exhaust flaps which are joined together to define a throat of minimum flow area with a converging channel defined by the primary flaps and a diverging channel defined by the secondary flaps. The primary and secondary flaps are conventionally movable between a generally closed position having a minimum throat area and a minimum outlet area at the aft end of the secondary flaps, and to a generally fully open position having a maximum throat area and a maximum outlet area.

Such converging-diverging (C-D) exhaust nozzles may either be axisymmetric or two-dimensional, or rectangular. In a two-dimensional C-D nozzle, the primary and secondary flaps extend transversely between a pair of spaced, nozzle sidewalls which collectively bound the exhaust gases being channeled therethrough. Since the primary and secondary flaps move relative to the stationary sidewalls, suitable seals are typically provided therebetween for reducing, if not eliminating, leakage of the exhaust gases from the converging and diverging channels, between the flaps and the sidewall, and outwardly therefrom. Leakage of the hot exhaust gases would require suitable thermal protection of components adjacent to the exhaust nozzle including, for example, hydraulic and electrical systems. Leakage of the exhaust gases also decreases the propulsion efficiency of the exhaust nozzle.

During operation of the exhaust nozzle, the gap between the exhaust flap and the nozzle sidewalls may expand due to pressure loading by the exhaust gases up to about 2.5 cm, for example. A suitable seal, therefore, must be able to bridge this relatively large gap while maintaining effective sealing, and should be relatively small for minimizing the use of space in the exhaust flap. Furthermore, since the seals are subject to hot exhaust gases, they must be effective for withstanding such temperatures for obtaining useful lifetimes.

For example, one type of conventional seal for an exhaust nozzle includes a hinged leaf seal effective for bridging a large gap between the exhaust flap and the sidewall. However, exhaust gas leakage through the hinge thereof decreases nozzle aerodynamic performance. Minimizing or reducing the amount of such hinge leakage has conventionally resulted in a more complex leaf seal.

OBJECTS OF THE INVENTION

Accordingly, one object of the present invention is to provide a new and improved seal for accommodating relatively large gaps between relatively movable members.

Another object of the present invention is to provide a hinged leaf seal which eliminates exhaust gas leakage through the hinge thereof.

Another object of the present invention is to provide a cooled seal assembly.

DISCLOSURE OF INVENTION

A seal assembly includes a housing having a plenum, a leaf seal rotatably joined to the housing to define a hinge. The leaf seal includes flow channels which receive a cooling fluid from the plenum for both cooling the leaf seal and preventing leakage of gases through the hinge.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawings in which:

MODE(S) FOR CARRYING OUT THE INVENTION

Figure 1:
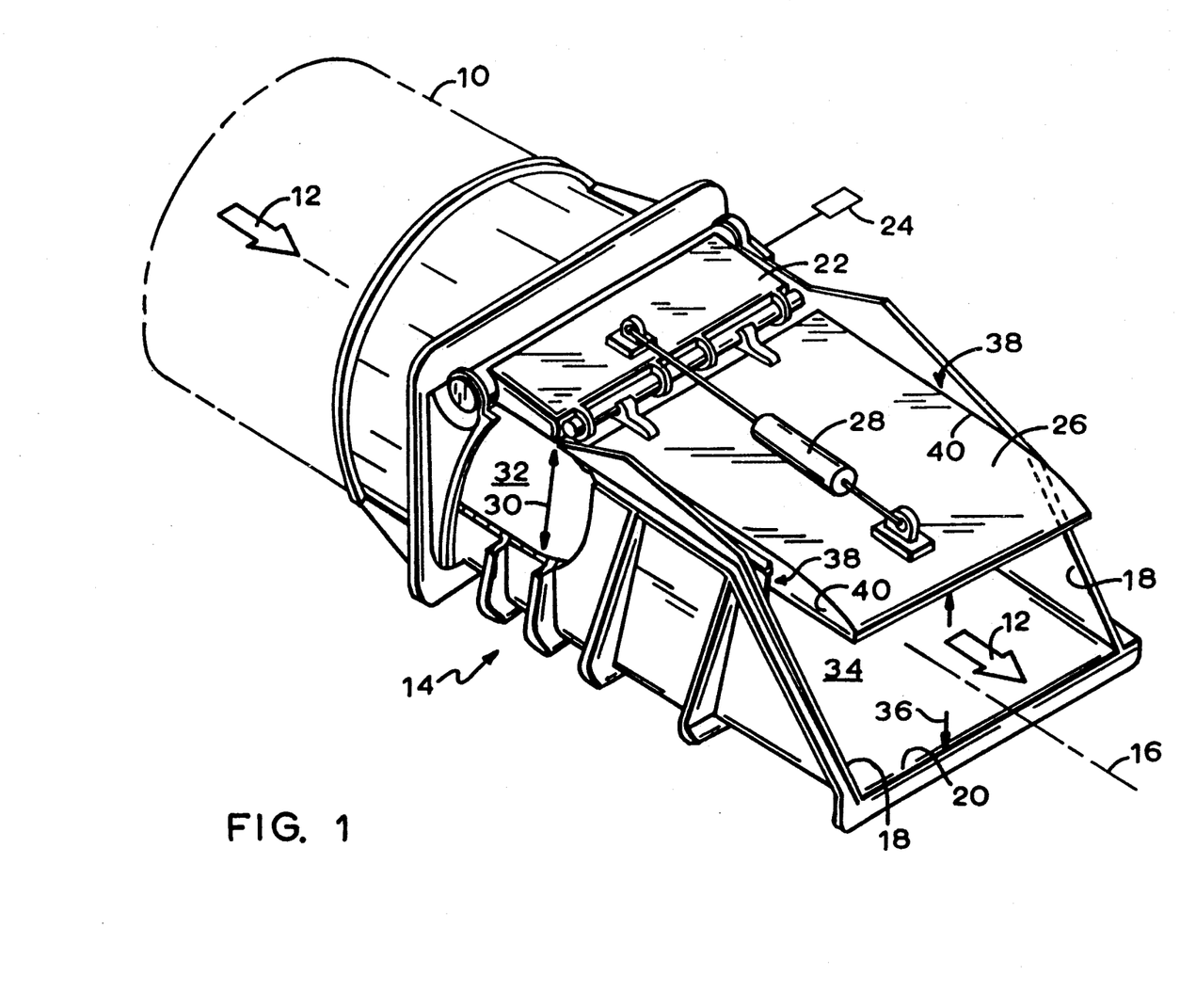
FIG. 1 is a schematic, perspective view of an exemplary gas turbine engine and exhaust nozzle having a seal assembly in accordance with one embodiment of the present invention.

Illustrated in FIG. 1 is a schematic, perspective view of a conventional augmented gas turbine engine shown in phantom line schematically at 10 which discharges exhaust gases 12 into an exemplary two-dimensional exhaust nozzle 14. In this exemplary embodiment, the nozzle 14 includes a longitudinal axis 16 and a pair of opposing, flat, nozzle sidewalls 18 spaced transversely outwardly from the longitudinal axis 16 for bounding the exhaust gases 12. A flat nozzle base-wall 20 is integrally joined between the sidewalls 18 for also bounding the exhaust gases 12.

A generally rectangular primary exhaust flap 22 is conventional pivotally supported to the exhaust nozzle 14 at upstream ends of the sidewall 18, and is pivotable by conventional first rotating means 24 joined thereto. A generally rectangular secondary exhaust flap 26 is conventionally pivotally supported to the downstream end of the primary flap 22 and is pivotable relative thereto by a conventional second rotating means 28.

In the exemplary embodiment of the exhaust nozzle 14 illustrated in FIG. 1, only a single primary flap 22 and a single secondary flap 26 are utilized for varying the flow of the exhaust gases 12 along the sidewalls 18 and base-wall 20. However, other two-dimensional exhaust nozzles 14 could also be used wherein instead of the stationary base-wall 20 a second set of primary and secondary exhaust flaps identical to the primary and secondary flaps 22 and 26 could be utilized.

The juncture between the primary flap 22 and the secondary flap 26 defines a throat 30 of relative minimum flow area, and the primary flap 22 defines with the base-wall 20 a generally converging channel 32 which extends downstream to the throat 30, and the secondary flap 26 defines with the base-wall 20 a generally diverging channel 34 extending downstream from the throat 30. The downstream ends of the secondary flap 26 and the base-wall 20 define a generally rectangular outlet 36 for discharging the exhaust gases 12 from the nozzle 14.

The rotating means 24 and 28 conventionally include hydraulic actuators and linkages for selectively varying the flow area of the exhaust gases 12 channeled through the nozzle 14. They are effective for positioning the primary and secondary flaps 22 and 26 in a fully open position as shown in FIG. 1 wherein the throat 30 and the outlet 36 have generally maximum flow areas and the secondary flap 26 diverges outwardly from the base-wall 20. The rotating means 24 and 28 are also effective for moving the primary and secondary flaps 22 and 26 to the fully closed position wherein the throat 30 and the outlet 36 have generally minimum flow areas. The primary flap 22 is, accordingly, rotated inwardly toward the base-wall 20, and the secondary flap 26 is also moved relatively close to the base-wall 20.

In order to seal the movable secondary flap 26 against the sidewalls 18, a seal assembly 38 in accordance with one embodiment of the invention is provided on each of the transverse sidewalls 40 of the secondary flap 26. As illustrated in more particularity in FIG. 2, the seal assembly 38 is disposed between the flap sidewall 40 and the nozzle sidewall 18 for sealing the gap G defined therebetween. Each of the seal assemblies 38 includes a housing 42, or hinge support, fixedly joined to the flap 26 at the sidewall 40 by a plurality of conventional fasteners. An elongate leaf seal 44 having a longitudinal axis 46 includes a proximal end 48 rotatably joined to the housing 42 to define a hinge therewith. The leaf seal 44 further includes a distal end 50 positionable adjacent to the sidewall 18 in sliding contact therewith for defining a seal line 52 for sealing flow of the exhaust gas 12 from leakage therebetween. As the secondary flap 26 is moved up and down in the general vertical direction V, the leaf seal 44 is urged against the sidewall 18 by the pressure loads acting thereon from the exhaust gases 12 having a first, or gas pressure $P_g$. The gap G between the flap 26 and the sidewall 18 above the leaf seal 44 is at a relatively low pressure, such as atmospheric pressure $P_a$, which is substantially less than the exhaust gas pressure $P_g$.

Figure 2:
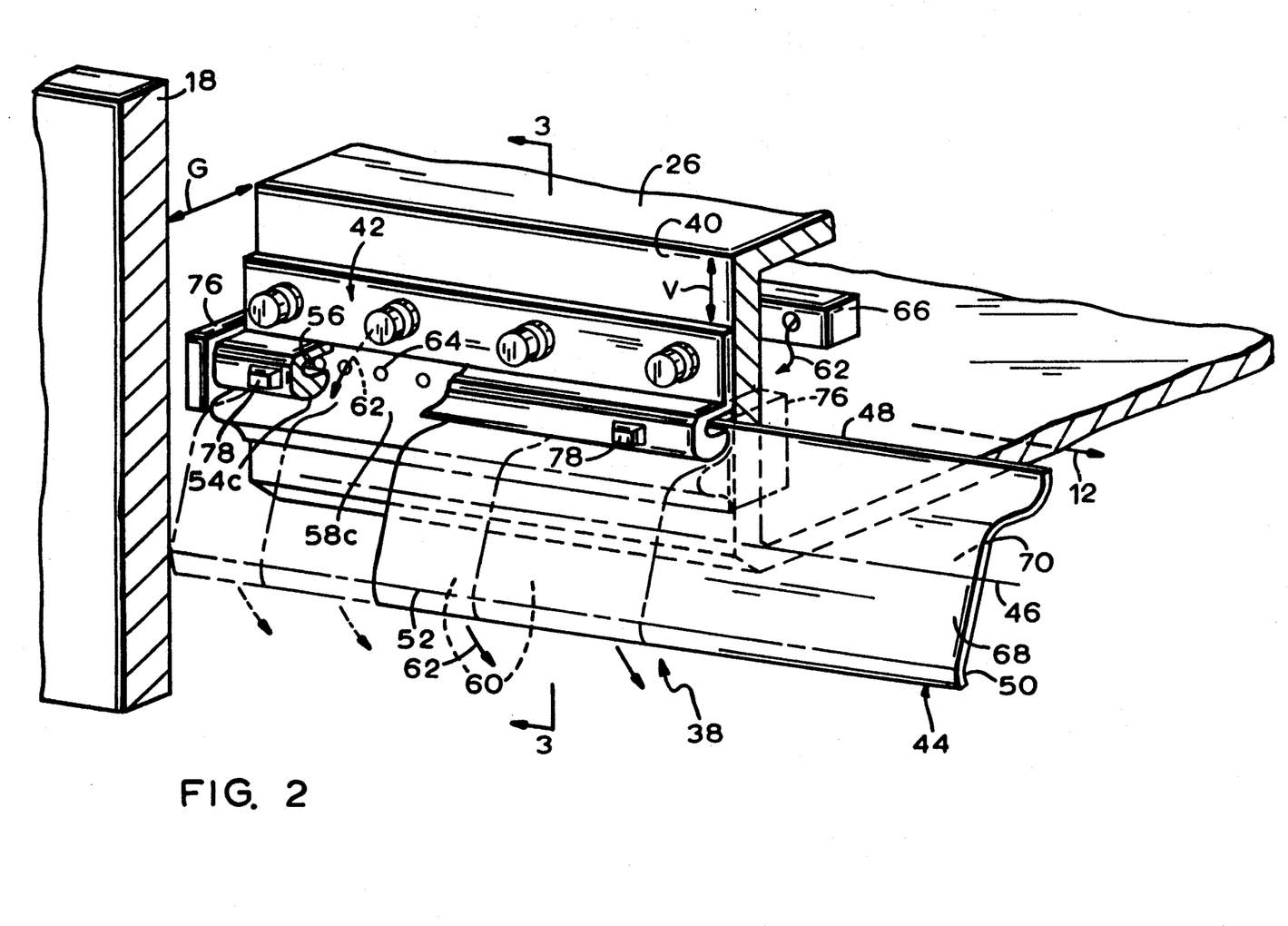
FIG. 2 is an enlarged, perspective, schematic view of one of the seal assemblies illustrated in FIG. 1.
Figures 3, 4:
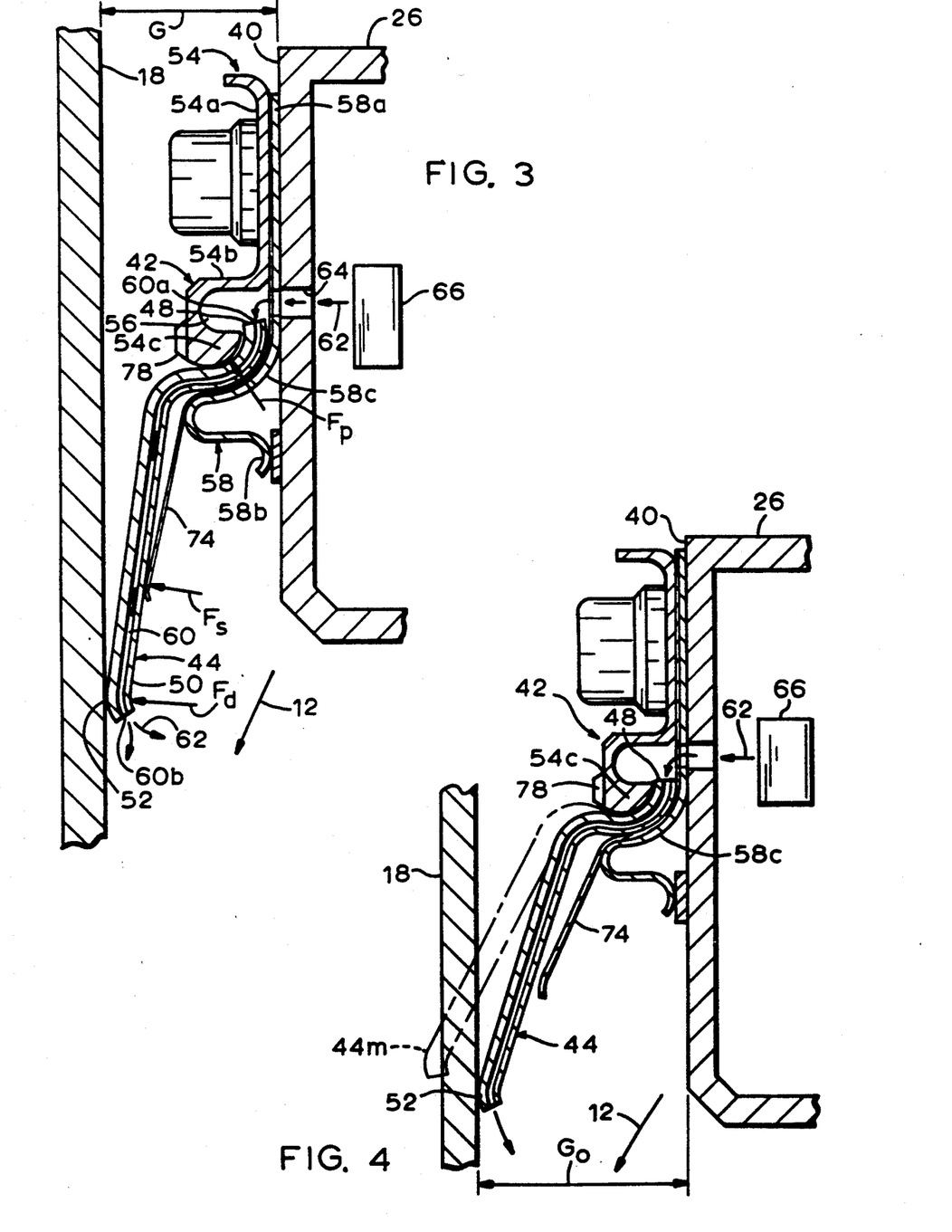
FIG. 3 is a transverse sectional view of the seal assembly illustrated in FIG. 2 taken along line 3—3 showing a leaf seal in a first position.
FIG. 4 is a transverse sectional view of the seal assembly illustrated in FIG. 2, similar to FIG. 3, showing the leaf seal in an extended position.

Referring to both FIGS. 2 and 3, the housing 42 includes a support plate 54 having a proximal end 54a fixedly joined to the flap 26 by the conventional fasteners, an intermediate portion 54b defining a generally U-shaped plenum 56 extending parallel to the longitudinal axis 46, and a distal end 54c spaced transversely from the flap sidewall 40 for supporting the leaf seal proximal end 48 against the pressure loads acting on the leaf seal 44 from the exhaust gas 12.

More specifically, and as illustrated in FIG. 3, the exhaust gases 12 act against the leaf seal 44 and generate pressure loads thereon having a component force $F_d$ acting on the leaf seal distal end 50 which urges that end against the sidewall 18 at the seal line 52. Another component $F_p$ of the pressure loads acts on the leaf seal proximal end 48 to urge that end against the support plate distal end 54c.

The housing 42 further includes a retainer plate 58 fixedly joined to the flap 26, for example by having a first end 58a disposed between the support plate proximal end 54a and the flap 26 and secured thereto by the fastener, and a second, opposite end 58b disposed below the support plate distal end 54c and fixedly joined to the flap sidewall 40 by conventional welding, for example. The retainer plate 58 also includes a stationary hinge portion 58c disposed closely adjacent to the leaf seal proximal end 48. The leaf seal proximal end 48 is thereby positioned between the support plate distal end 54c and the retainer plate hinge portion 58c to define the hinge for allowing the leaf seal 44 to rotate relative to the flap 26 as the leaf seal proximal end 48 slides therebetween.

For example, FIG. 3 illustrates the leaf seal 44 in an initial, or cold, position at an initial value of the gap G. FIG. 4 illustrates an operating condition where the pressure $P_g$ of the exhaust gases 12 urge the nozzle sidewall 18 away from the flap sidewall 40 to increase the gap therebetween to an operating value $G_o$. The leaf seal 44 rotates in the clockwise direction as shown to continue to seal the increased gap $G_o$, with the leaf seal proximal end 48 sliding between the support plate distal end 54c and the retainer plate hinge portion 58c as the leaf seal 44 undergoes pivotal or hinged motion. The retainer plate hinge portion 58c thus allows rotation of the leaf seal 44 while retaining the leaf seal proximal end 48 adjacent to the support plate distal end 54c.

Referring again to FIGS. 2 and 3, the leaf seal 44 further includes a plurality of internal flow channels 60 extending from the proximal end 48 to the distal end 50. As shown in more particularity in FIG. 3, each of the channels 60 includes an inlet 60a at the leaf seal proximal end 48 disposed in flow communication with the plenum 56, and an outlet 60b at the leaf seal distal end 50. Means are provided for supplying a cooling fluid 62, such as pressurized compressor or fan air from the gas turbine engine 10, into the plenum 56 for flow through the channels 60 to cool the leaf seal 44. The cooling fluid 62 has a second pressure $P_c$ which is greater than the exhaust gas pressure $P_g$ to ensure that the cooling fluid 62 flows through the channel 60 and is discharged from the outlets 60b into the exhaust gas 12. In this way, backflow of the exhaust gas 12 through the outlets 60b and the flow channels 60 is prevented, which prevents both undesirable heating of the leaf seal 44 and leakage of the exhaust gas 12 through the leaf seal 44 and into the plenum 56.

The cooling air supplying means is in the exemplary form of a plurality of longitudinally spaced apertures 64 which extend through the flap sidewall 40 and the retainer plate 58 in flow communication with the plenum 56. A conduit 66 is shown schematically inside the flap 26 and is disposed in flow communication with the apertures 64 for channeling therethrough the cooling fluid 62 into the plenum 56. The cooling fluid 62 may be provided through the apertures 64 by any conventional means including, for example simply channeling the cooling fluid 62 from the gas turbine engine 10 and into the interior of the secondary flap 26. Alternatively, the conduit 66 may simple be a conventional manifold disposed within the flap 26 and suitably joined in flow communication with the apertures 64.

Figure 5:
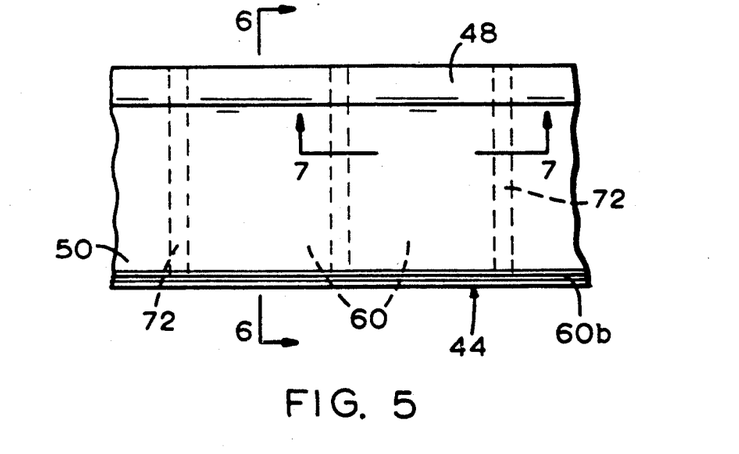
FIG. 5 is a plan view of a portion of the seal assembly illustrated in FIG. 2
Figure 6:
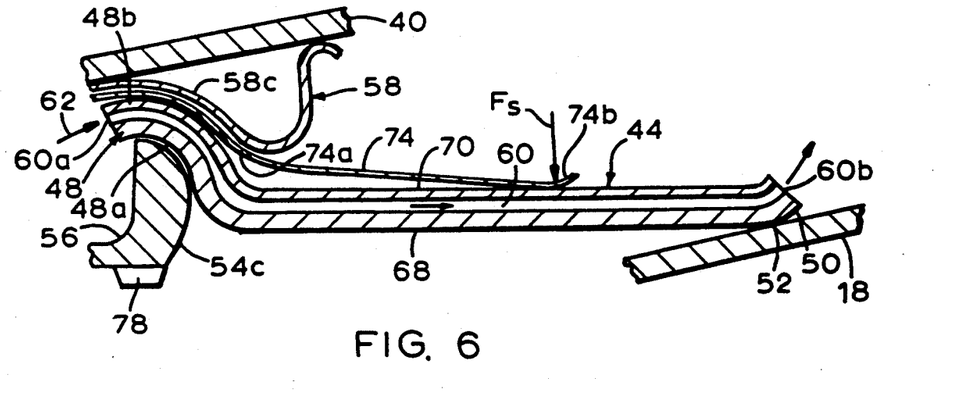
FIG. 6 is a transverse sectional view of the seal assembly illustrated in FIG. 5 taken along line 6—6.
Figure 7:
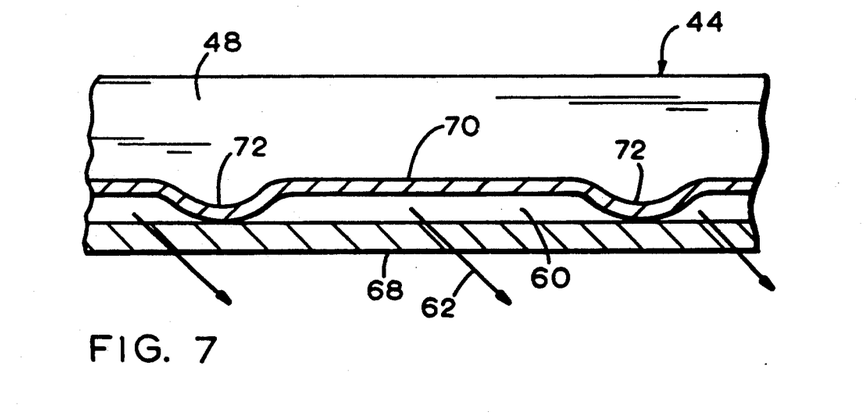
FIG. 7 is a longitudinal sectional view of the seal assembly illustrated in FIG. 5 taken along line 7—7.

Portions of the leaf seal 44 are illustrated in more particularity in FIGS. 5, 6, and 7. The leaf seal 44 is in the form of, and includes, both a seal plate 68 and a cooling plate 70. The seal plate 68 is relatively thick compared to the relatively thin cooling plate 70 for accommodating the pressure loads acting on the leaf seal 44 from the exhaust gas 12. As illustrated in FIG. 6, the seal plate 68 includes the distal end 50 disposed in sliding contact with the sidewall 18 along the seal line 52. The cooling plate 70 is spaced from the seal plate 68 to define the flow channels 60 therebetween for channeling the cooling fluid 62 to cool the leaf seal 44. The cooling plate 70 is complementary in transverse profile to that of the seal plate 68 and extends generally coextensively therewith along the longitudinal axis 46 (as shown in FIG. 2) and from the leaf seal proximal end 48 to the distal end 50.

As illustrated in FIGS. 5 and 7, the cooling plate 60 preferably includes a plurality of longitudinally spaced convolutions 72 extending from the leaf seal proximal end 48 to the distal end 50 and conventionally fixedly joined to the seal plate 68, for example by being spot welded thereto. The flow channels 60 are defined between adjacent ones of the convolutions 72, and between the cooling plate 70 and the seal plate 68 which are spaced apart by the convolutions 72.

As illustrated, for example, in FIG. 6, a spring 74, in the preferred form of a leaf spring, is disposed between the leaf seal 44 and the flap sidewall 40 for urging the leaf seal distal end 50 in contact with the nozzle sidewall 18. In one embodiment, the leaf spring 74 includes a proximal end 74a fixedly joined to the retainer plate 58, for example along the hinge portion 58c, and a distal end 74b slidably disposed adjacent to the cooling plate 70 for pushing the leaf seal distal end 50 toward the nozzle sidewall 18. In this embodiment, the leaf spring 74 generates a pushing spring force $F_s$ at its distal end 74b against the cooling plate 70.

Referring again to FIG. 2, the leaf seal 44 is shown in solid line partially inserted into the housing 42 between the support plate distal end 54c and the retainer plate hinge portion 58c along the longitudinal axis 46. This allows for easy installation, or replacement, of the leaf seals 44. The leaf seal 44 is shown in phantom line in its fully inserted position, and a pair of retainer end caps 76 are suitably secured to the longitudinal ends of the housing 42, by welding for example, to capture and axially retain the leaf seal 44 within the housing 42 during operation. Since the leaf seal proximal end 48 is allowed to slide transversely between the support plate distal end 54c and the retainer plate hinge portion 58c as it pivots, as shown in FIGS. 3 and 4, the leaf seal 44 could also be inserted or removed from the housing 42 in the transverse direction provided the nozzle sidewall 18 is first removed. However, in the preferred embodiment, it is preferred that the leaf seal 44 may not be removed from the housing 42 in the transverse direction by pivoting about the support plate distal end 54c. Accordingly, a plurality of longitudinally spaced raised projections, or stops 78, as shown for example in FIGS. 2 and 4, are provided for limiting the pivotal movement of the leaf seal 44 from the housing 42. As shown in FIG. 4 in phantom, the leaf seal 44 has a maximum travel designated 44m which is effected by the stops 78 butting against the leaf seal 44 near the distal end 48 for preventing further rotation.

As illustrated, for example in FIG. 6, the leaf seal proximal end 48 is preferably arcuate toward both the support plate distal end 54c and the retainer plate hinge portion 58c to define the hinge for sliding movement therebetween. In one embodiment, the leaf seal proximal end 48 has a concave side 48a facing toward the support plate distal end 54c, and an opposite convex side 48b facing toward the retainer plate hinge portion 58c. The support plate distal end 54c is preferably complementary to the leaf seal proximal end 48 and is convex toward the concave side 48a of the leaf seal proximal end 48 for providing a surface against which the leaf seal 44 may rotate, a surface for bearing the pressure force $F_p$ (as shown in FIG. 3), and a surface against which the concave side 48a slides against for providing a seal for resisting leakage of the high pressure cooling fluid 62 from the plenum 56.

The retainer plate hinge portion 58c is also preferably complementary to the leaf seal proximal end 48 and is concave toward the convex side 48b of the leaf seal proximal end 48. Since the leaf spring proximal end 74a is disposed therebetween, it too is concave toward the convex side 48b. This arrangement also provides an effective seal for resisting leakage of the high pressure cooling fluid 62 from the plenum 56 and provides an extended boundary for ensuring retention of the leaf seal proximal end 48 in the housing 42 against the support plate distal end 54c.

Since the leaf seal proximal end 48 is arcuate for about 90°, and extends only up to the plenum 56, travel of the leaf seal 44 away from the flap sidewall 40 is preferably limited by the stops 78 to ensure that as the proximal end 48 slides outwardly from the housing 42 between the distal end 54c and the hinge portion 58c, it remains captured therebetween for up to the full extent of travel of the leaf seal 44 as illustrated in phantom at 44m in FIG. 4. In this way, the stops 78 limit rotation of the leaf seal 44 for preventing the leaf seal 44 from rotating out from between the support plate distal end 54c and the retainer plate hinge portion 58c.

Figure 8:
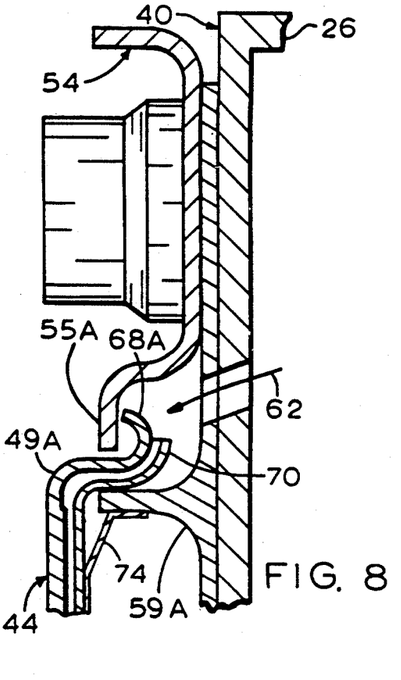
FIG. 8 is a transverse sectional view of another embodiment of the seal assembly illustrated in FIG. 2.
Figure 9:
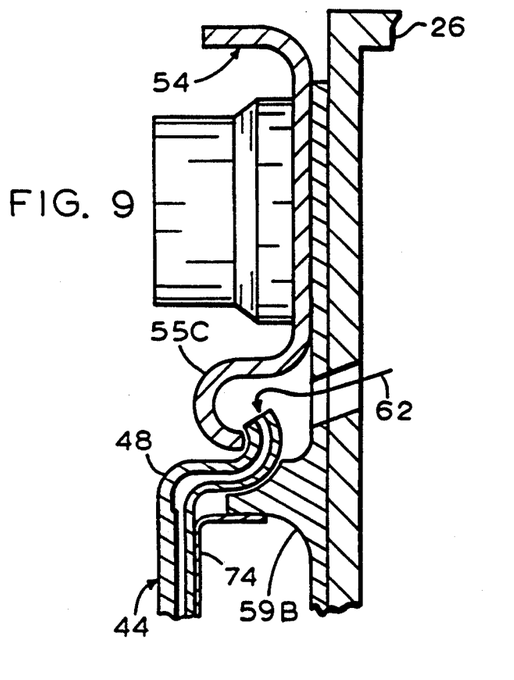
FIG. 9 is a transverse sectional view of another embodiment of the seal assembly illustrated in FIG. 2.
Figure 10:
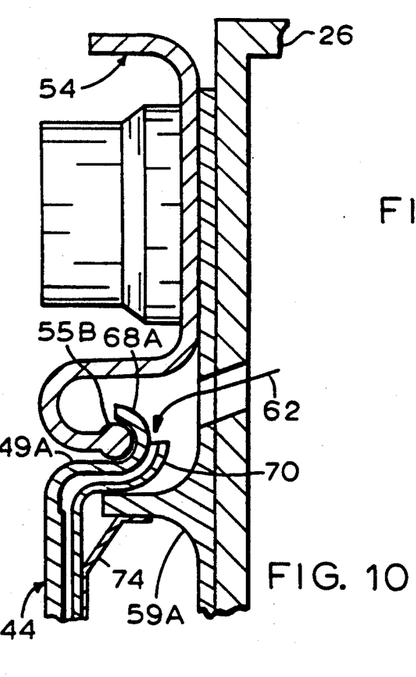
FIG. 10 is a transverse sectional view of another embodiment of the seal assembly illustrated in FIG. 2.
Figure 11:
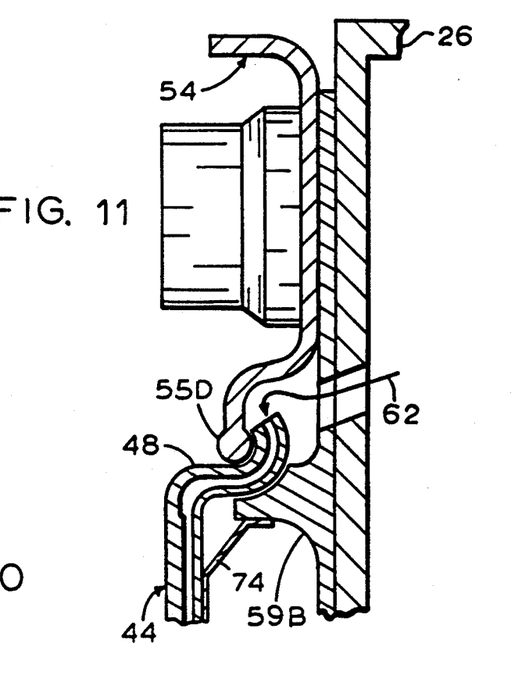
FIG. 11 is a transverse sectional view of another embodiment of the seal assembly illustrated in FIG. 2.
Figure 12:
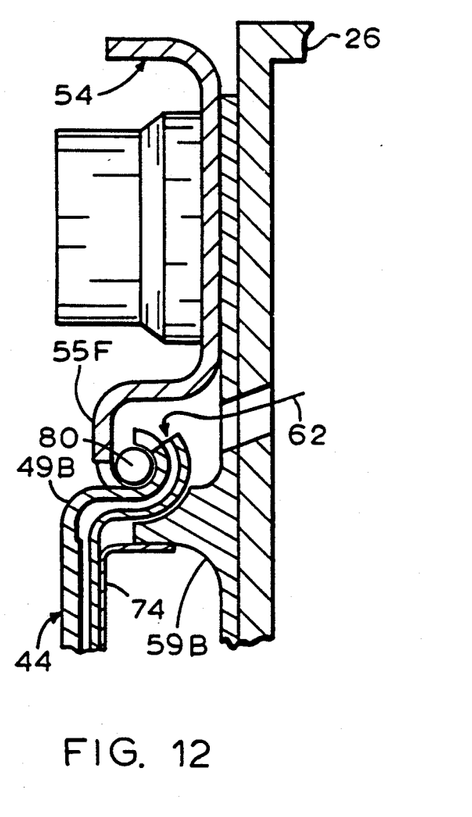
FIG. 12 is a transverse sectional view of another embodiment of the seal assembly illustrated in FIG. 2.
Figure 13:
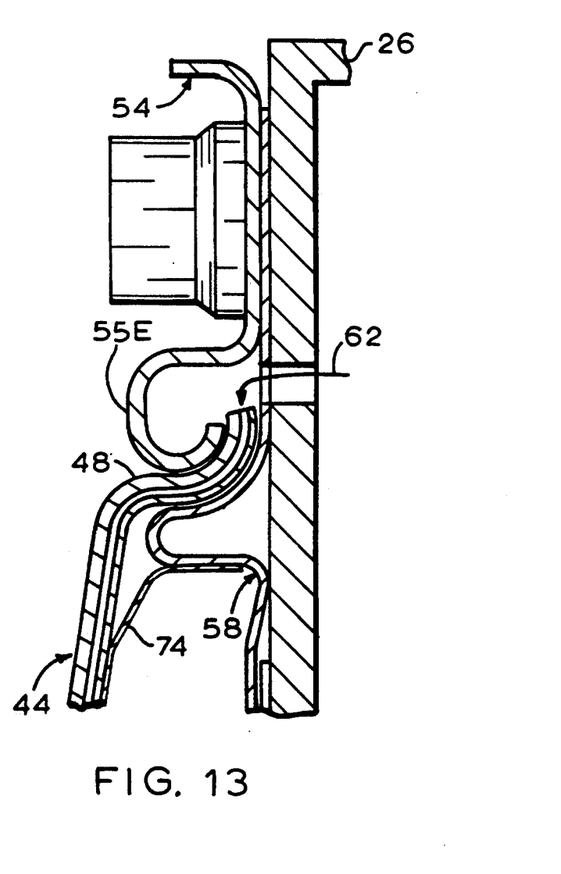
FIG. 13 is a transverse sectional view of another embodiment of the seal assembly illustrated in FIG. 2.

FIGS. 8 through 13 illustrate various alternative embodiments of the hinge defined by the leaf seal proximal end 48, the support plate distal end 54c, and the retainer plate hinge portion 58c. In FIGS. 9, 11, and 13 the leaf seal proximal end 48 is identical to that described above. In FIGS. 8 and 10, the leaf seal proximal end, designated 49A are identical to each other and include a seal plate proximal end 68A which is concave for about 180° toward the support plate distal ends 55A and 55B, respectively The cooling plate 70 is concave for about 90° and is set back from the proximal ends 68A for providing direct access for the cooling fluid 62. In the FIG. 8 embodiment, the support plate distal end 55A is simply rectangular and straight, spaced parallel to the flap sidewall 40 and is aligned generally along the diameter of the semi-circular leaf seal proximal end 68a. In the FIG. 10 embodiment, the support plate distal end 55B is generally circular in transverse section and fits snugly in the concave leaf seal proximal end 68A. In FIG. 9, the support plate distal end 55C is arcuate for about 180° and has its end disposed in contact with the concave surface of the leaf seal proximal end 48.

In FIG. 11, the support plate distal end 55D combines the circular transverse section of the FIG. 10 embodiment with the parallel orientation of the FIG. 8 embodiment. In FIG. 13, the support plate distal end 55E is convex for about 270° and supports the leaf seal proximal end 48. And, in FIG. 12, the support plate distal end 55F also extends for about 270° but is in the form of a conventional hinge having a hinge pin 80 extending therethrough for supporting a complementary leaf seal proximal end 49B.

In all of the embodiments illustrated in FIGS. 8-13, the support plates 54 are fabricated sheet metal structures, whereas in the embodiment illustrated in FIG. 3, for example, the support plate 54 is a cast, or machined structure.

In the embodiment illustrated in FIG. 13, the retainer plate 58 is similar to the retainer plate illustrated in FIG. 3 and is a fabricated sheet metal structure. However, in the embodiments illustrated in FIGS. 8-12, the respective retainer plates are cast, or machined components, with the retainer plates 59A illustrated in FIGS. 8 and 10 being identical with the respective hinge portions thereof being straight components extending perpendicularly outwardly from the flap sidewall 40 and adjacent to the leaf, seal 44. In FIGS. 9, 11, and 12, the retainer plates 59B are identical to each other and the respective hinge portions thereof are simply concave surfaces extending for about 90°.

Figure 14:
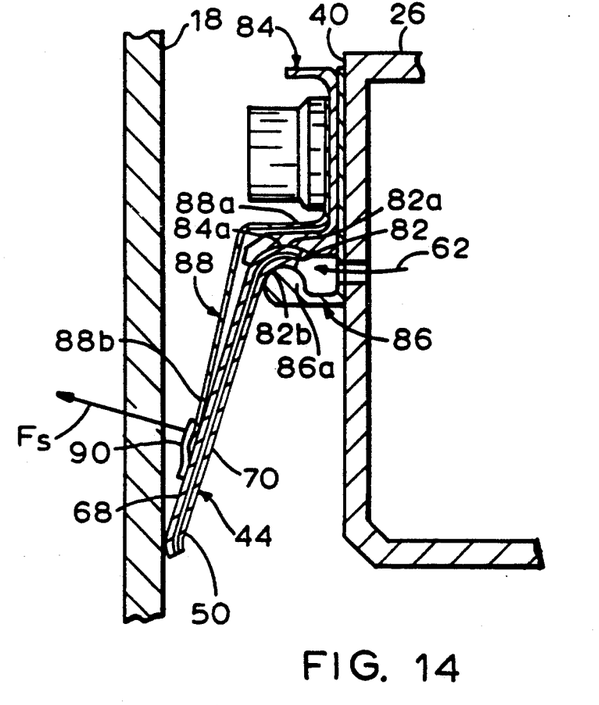
FIG. 14 is a transverse sectional view of another embodiment of the seal assembly illustrated in FIG. 2.

In all of the embodiments illustrated in FIGS. 8-13, effective sliding movement between the respective support plate distal ends and the retainer plate hinge portions is obtained for pivotal movement of the leaf seal 44. In all of the above embodiments of the invention, the respective leaf seal proximal ends are concave toward the respective support plate distal ends. Illustrated in FIG. 14 is another embodiment of the present invention wherein the proximal end, designated 82, of the leaf seal 44 has a convex side 82a facing toward the distal end 84a of the support plate 84 which is concave toward the convex side 82a of the leaf seal proximal end 82. The leaf seal proximal end 82 has an opposite, concave side 82b facing toward the hinge portion 86a of the retainer plate 86, which is convex toward the concave side 82b of the leaf seal proximal end 82.

Figure 15:
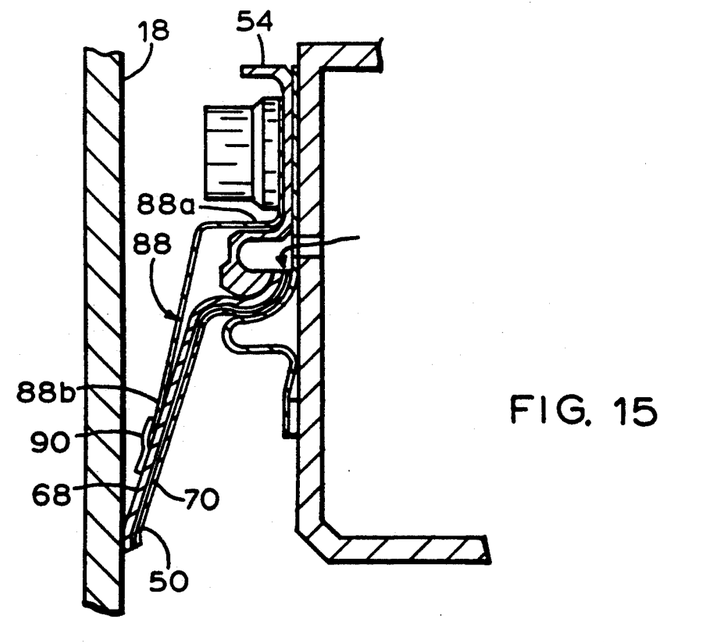
FIG. 15 is a transverse sectional view of another embodiment of the seal assembly illustrated in FIG. 2.

The embodiment of the invention illustrated in FIG. 14 shows an opposite arcuate orientation of the hinge defined at the leaf seal proximal end 82 as compared to the one defined by the leaf seal proximal end, such as end 48, of the various embodiments described above. Furthermore, the spring 74 may instead of being disposed on the hot side of the leaf seal 44 in contact with the cooling plate 70, may instead be located on the cold side of the leaf seal 44 in contact with the seal plate 68. As shown in both of the embodiments of the invention illustrated in FIGS. 14 and 15, the leaf spring, designated 88 includes a proximal end 88a fixedly joined to the support plates 54, 84, for example by the fastener already provided, and a distal end 88b slidably joined to the seal plate 68 for pulling the leaf seal distal end toward the nozzle sidewall 18 by the spring force $F_s$. A clip 90 is fixedly attached to the seal plate 68, by welding for example, and includes an opening for receiving and retaining the leaf spring distal end 88b. In this way, the leaf spring distal end 88b is allowed to slide inside the clip 90 as the leaf seal 44 rotates while still providing the spring force $F_s$ for pulling the leaf seal 44 toward the nozzle sidewall 18.

In the several embodiments of the invention disclosed above, the leaf seal 44 is effective for bridging and sealing large excursions between the nozzle sidewall 18 and the flap sidewall 40 by rotation relative to the housing 42. The various hinges defined at the leaf seal proximal ends 48 allow sliding movement thereof for pivoting the leaf seal 44 while providing effective internal seals against leakage of the cooling fluid 62 from the plenum 56. The cooling fluid 62 is channeled through the flow channels 60 for cooling the leaf seal 44 for both improving its useful life as well as allowing higher temperatures of the exhaust gases 12 for improving overall efficiency of the gas turbine engine 10 and the exhaust nozzle 14. The pressurized cooling fluid 62 also prevents leakage of the exhaust gas 12 through the hinges since the cooling fluid 62 is at a greater pressure relative thereto, thusly avoiding performance losses which would otherwise occur due to leakage of the exhaust gases 12 past the hinge.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

For example, the seal assembly 38 may also be used for sealing the sides of the primary exhaust flap 22 with the sidewalls 18, and may be used in other types of two-dimensional exhaust nozzles.

Accordingly, what is desired to be secured by Letters Patent of the United States is the invention as defined and differentiated in the following claims:

We claim:

1. A seal assembly for sealing a gap between a movable flap and a stationary sidewall comprising:
   a housing fixedly joined to said flap, and including a plenum;
   a leaf seal having a proximal end rotatably joined to said housing to define a hinge therewith; a distal end positionable adjacent to said sidewall in sliding contact therewith for sealing flow of a gas therebetween, said gas having a first pressure; and a plurality of internal flow channels extending from said proximal to distal ends, each including an inlet at said proximal end disposed in flow communication with said plenum, and an outlet at said distal end; and
   means for supplying a cooling fluid into said plenum for flow through said flow channels at a second pressure greater than said first pressure.

2. A seal assembly according to claim 1 wherein said housing further includes:
   a support plate having a proximal end fixedly joined to said flap, an intermediate portion defining said plenum, and a distal end for supporting said leaf seal proximal end against pressure loads acting on said leaf seal from said gas; and
   a retainer plate fixedly joined to said flap and having a hinge portion disposed adjacent to said leaf seal proximal end, said leaf seal proximal end being positioned between said support plate distal end and said retainer plate hinge portion to define said hinge for allowing said leaf seal to rotate relative to said flap as said leaf seal proximal end slides therebetween.

3. A seal assembly according to claim 2 wherein said leaf seal further includes:
   a seal plate having said distal end in sliding contact with said sidewall and being effective for accommodating pressure loads acting thereon from said gas; and
   a cooling plate spaced from said seal plate to define said flow channels for channeling said cooling fluid to cool said leaf seal.

4. A seal assembly according to claim 3 wherein said cooling plate includes a plurality of longitudinally spaced convolutions extending from said leaf seal proximal to distal ends and fixedly joined to said seal plate to define said flow channels.

5. A seal assembly according to claim 3 further including a spring disposed between said leaf seal and said flap for urging said leaf seal distal end in contact with said sidewall.

6. A seal assembly according to claim 5 wherein said spring includes a proximal end fixedly joined to said retainer plate, and a distal end slidably disposed adjacent to said cooling plate for pushing said leaf seal distal end toward said sidewall.

7. A seal assembly according to claim 5 wherein said cooling fluid supplying means include:
   a plurality of apertures extending through said flap in flow communication with said plenum; and
   a conduit disposed in flow communication with said apertures for channeling said cooling fluid therethrough.

8. A seal assembly according to claim 5 wherein said leaf seal proximal end is arcuate toward both said support plate distal end and said retainer plate hinge portion to define said hinge for sliding movement therebetween.

9. A seal assembly according to claim 8 wherein said leaf seal proximal end has a concave side toward said support plate distal end and a convex side toward said retainer plate hinge portion.

10. A seal assembly according to claim 9 wherein said support plate distal end is convex toward said concave side of said leaf seal proximal end.

11. A seal assembly according to claim 10 wherein said retainer plate hinge portion is concave toward said convex side of said leaf seal proximal end.

12. A seal assembly according to claim 11 wherein said support plate distal end includes a plurality of longitudinally spaced stops disposed thereon to limit rotation of said leaf seal for preventing said leaf seal from rotating out from between said support plate distal end and said retainer plate hinge portion.

13. A seal assembly according to claim 8 wherein said flap is an exhaust flap of a gas turbine engine exhaust nozzle and said gas is exhaust gas bounded by said flap and said sidewall.

14. A seal assembly according to claim 3 further including a spring disposed between said leaf seal and said sidewall, wherein said spring includes a proximal end fixedly joined to said support plate, and a distal end slidably joined to said seal plate for pulling said leaf seal distal end toward said sidewall.

15. A seal assembly according to claim 14 wherein said leaf seal proximal end is arcuate toward both said support distal end and said retainer plate hinge portion to define said hinge for sliding movement therebetween.

16. A seal assembly according to claim 15 wherein said leaf seal proximal end has a convex side toward said support plate distal end, and a concave side toward said retainer plate hinge portion.

17. A seal assembly according to claim 16 wherein said support plate distal end is concave toward said convex side of said leaf seal proximal end, and said retainer plate hinge portion is convex toward said concave side of said leaf seal proximal end.

* * * * *